US006496744B1

(12) United States Patent
Cook

(10) Patent No.: US 6,496,744 B1
(45) Date of Patent: *Dec. 17, 2002

(54) METHOD AND SYSTEM FOR CUSTOM MANUFACTURE AND DELIVERY OF A DATA PRODUCT

(76) Inventor: David Philip Cook, 15 Downs Lake Cir., Dallas, TX (US) 75230

( * ) Notice: Subject to any disclaimer, the term of this patent is extended or adjusted under 35 U.S.C. 154(b) by 0 days.

This patent is subject to a terminal disclaimer.

(21) Appl. No.: 09/228,458

(22) Filed: Jan. 11, 1999

(51) Int. Cl.[7] .............................................. G06F 19/00
(52) U.S. Cl. .............................. 700/95; 700/48; 705/26
(58) Field of Search ........................... 700/95–103, 48; 705/26–30, 16, 17, 18, 51–52, 64, 75–77; 395/200.42, 200.36, 200.47, 200.59, 200.32, 200.33; 707/104, 3, 6

(56) References Cited

U.S. PATENT DOCUMENTS

| 5,721,903 A | * | 2/1998 | Anand et al. | 707/5 |
| 5,860,068 A | * | 1/1999 | Cook | 705/26 |
| 5,918,213 A | * | 6/1999 | Bernard et al. | 705/26 |
| 5,923,552 A | * | 7/1999 | Brown et al. | 364/468.06 |
| 5,968,110 A | * | 10/1999 | Westrope et al. | 703/27 |
| 5,970,471 A | * | 10/1999 | Hill | 705/26 |
| 5,974,004 A | * | 10/1999 | Dockes et al. | 369/30 |
| 6,023,683 A | * | 2/2000 | Johnson et al. | 705/26 |
| 6,032,130 A | * | 2/2000 | Alloul et al. | 705/27 |

* cited by examiner

*Primary Examiner*—Leo Picard
*Assistant Examiner*—Kidest Bahta
(74) *Attorney, Agent, or Firm*—Hughes & Luce LLP

(57) ABSTRACT

A system for selling, manufacturing and distributing a custom digital data product from retail stores, over the Internet, over the telephone, or by electronic means (e.g., fax, e-mail, and the like) wherein a customer is provided (e.g., by electronic mail verification) order tracking information. After a customer selects a "set" of sound recordings or data from a library or catalog of such recordings or data and payment or credit is received or verified, an image of the "set" is assembled from a storage or "disk" farm. The image is preferably assembled at a manufacturing facility, e.g., a CD-ROM burner farm, where the product is then made. Every data object on the product may have a code associated therewith for later reference. The disk and burner farms communicate via a high speed communications subsystem to facilitate continuous processing. Upon assembly and manufacture, the product is packaged and shipped. Throughout the manufacture and distribution, the customer may track the process by activating a hyperlink in one or more e-mail confirmation messages provided by the service provider, or by entering order/tracking numbers from retail terminals or by telephone, or the like.

32 Claims, 2 Drawing Sheets

METHOD AND SYSTEM FOR CUSTOM MANUFACTURE AND DELIVERY OF A DATA PRODUCT

BACKGROUND OF THE INVENTION

1. Technical Field

The present invention relates generally to computer-aided product manufacture and distribution and, more particularly, to a method and system for assembly, manufacture and distribution of custom "data" products, such as a CD (read only), CD (read/write), DVD or similar static storage medium (collectively, a "CD" or "CD-ROM"), especially a CD product incorporating customer-selected musical sound recordings.

2. Description of the Related Art

The standard model for the manufacture and distribution of music is well-established in the entertainment industry. With the explosive growth of the Internet, however, it is now possible to transfer large amounts of digital data electronically. Thus, the Internet has the capability of being a useful medium for transfer of digital data comprising sound recordings. To this end, it has been proposed to provide an "interactive" World Wide Web ("WWW") site at which users may create their own "custom" CD-ROMs. Using an interactive "fill-in form" type of interface, the user selects a plurality of sound recordings from a library or catalog of available recordings. Once the CD selections are made, the user is prompted for a credit card number. The credit card is verified, and the CD-ROM is then manufactured and delivered to the user.

Although the above-described system has the advantage of enabling a user of the Internet to create a custom CD product, there are no currently available sites from which a broad range of musical recordings may be assembled, nor are the sites or assembly operations scaleable to facilitate large scale operations. Moreover, such sites do not provide significant tracking, inventory control and other administrative and management tools to facilitate such a large-scale operation.

The present invention addresses this problem.

SUMMARY OF THE INVENTION

It is a primary goal of the present invention to provide a custom CD assembly, manufacturing and distribution method and system.

It is a more specific object of this invention to enable a customer to assemble or create a user-defined "set" of musical recordings from a massive library or archive of such recordings. After selection, the set of recordings are "assembled" and "burned" into a physical medium (such as a CD-ROM), preferably at a large-scale manufacturing or "burning" facility. Individual burner machines in the facility operate in an essentially autonomous or "standalone" manner to facilitate large scale production of custom CD products. This "burner-centric" architecture facilitates continuous and efficient production of products as the service is scaled to handle very large number of orders in a concurrent fashion.

It is a more general object of the invention to implement a large-scale custom music CD service where custom CD-ROMs (or other such digital "products") are ordered at retail establishments, over the Internet, by electronic communication (e.g., fax, e-mail, or the like) or over a conventional telephone connection.

It is still another object of this invention to implement a computer-assisted custom CD ordering, assembly, manufacturing and distribution service wherein a customer may easily track the entire manufacturing and delivery process at all operative stages.

It is yet another more general object of this invention to provide computer-aided ordering, assembly, manufacturing and distribution of digital data products.

It is yet another aspect of this invention to maintain, in the custom CD manufacturing system, certain information about a customer's musical or data preferences, creditworthiness, and past buying habits, to thereby facilitate future product purchase transactions.

Another more specific object of this invention is to provide such a system for making, selling and distributing a custom digital data product over the Internet, in retail stores, via electronic communication, or over the telephone, wherein a customer is provided (preferably by electronic mail ("e-mail") verification) with order tracking information.

According to the invention, a customer "orders" a custom product in a variety of ways. Thus, for example, a customer may create, order and purchase the product from a retail site and, in particular, through entry of information at a computer terminal in an online process. Preferably, but not necessarily, the computer terminal is a "diskless" computer, also known as a "network" computer. Alternatively, a user may create, order and purchase the product by accessing an Internet site from which the custom CD "service" is provided. Another alternative is for the user to access a telephone network (such as an 800-number service), and to order the custom CD through interaction with a human or automated operator, or by fax or e-mail. Regardless of how the user accesses the system, it is assumed that the customer selects a "set" of sound recordings (or data) from a library or catalog of such recordings (or data), and he or she then determines the order of presentation of the selected recordings (or data). The library of available recordings is preferably supported by a massive "disk farm," which is preferably a relatively large collection of computers on which (or attached to which) are stored digital data comprising the available recordings (or data). Once the CD has been assembled in a manner to allow the system to automatically "manufacture" the product, the product is preferably created at a dedicated manufacturing facility (e.g., a "burner farm"). The product is then shipped to the customer, or to some third party as may be requested by the customer.

Preferably, the individual song tracks comprising the requested CD product are assembled at the burner farm. Alternatively, the customer (or the disk farm) may assemble the song data in a prior process and submit the assembled data (e.g., as a "compilation") to a burner machine directly or alternatively transmit the data electronically.

In accordance with a preferred embodiment of the invention, a custom CD set is created in an online manner using an appropriate user interface. Then, the customer is prompted to enter appropriate information from which some form of payment is extracted. Thus, for example, the user may enter his or her credit card number through a secure interface (e.g., a secure sockets layer or "SSL"). Upon payment or credit verification, the set of data components (i.e., the song tracks) selected by the customer are caused to be transferred from the disk farm to the manufacturing facility, which preferably comprises a collection of machines that "burn" or otherwise generate the products. The set of components is sometimes referred to as an "image" of the CD product. Preferably, the "burner" farm (like the disk farm) comprises a large number of connected computers and associated burner machines useful in manufacturing CD-ROM (or other digital data) products. The system further includes appropriate control, administrative and management routines and devices as are necessary to ensure that a large number of products may be continually assembled, manufactured, packaged and shipped as multiple customers continually access the facility (e.g., through retail sites, the Web site, through direct electronic communication, and the like) and multiple product "images" are in turn transferred from the disk farm to the facility.

In a particular preferred embodiment, large scale processing of CD product orders is facilitated by operating a burner farm with many hundreds or even thousands of individual burner machines. The entire set of such machines is preferably organized into a hierarchy of subgroups, with each subgroup including approximately 30–50 individual burner machines, depending on available bandwidth, burn capability and other considerations. Upon initialization, however, each individual burner machine or server is self-directed or "autonomous" and thus takes on as much "work" (e.g., new requests to burn CD products) as it is capable of handling given the network and subgroup load, and other operating conditions. The manufacturing facility is thus "burner-centric," as individual burner machines or servers in the large set of such machines control their own destiny. This architecture is highly scaleable and efficient, and it facilitates processing of a very large number of concurrent orders as such orders are placed from the various order entry terminals and other means previously described.

Preferably, after an order is "accepted" for processing, a customer is provided with an e-mail communication verifying the transaction. The e-mail message preferably also includes a "hyperlink" that includes an order confirmation or other order tracking identifying number(s). Activation of the hyperlink by the customer automatically launches the customer's Web browser software to a Web site from which he or she may then track the manufacture of the actual product (i.e., during the various stages of assembly and burning of the CD-ROM). After the product has been manufactured and packaged, the customer preferably is provided with a second e-mail indicating that the product has been shipped. Preferably, the second e-mail also includes a hyperlink with an associated shipping tracking number. Upon activation of the hyperlink, the customer accesses the Web site (or some other site, such as a UPS® or Federal Express® site) and may then "follow" the product as it moves to its intended destination through one or more distribution channels.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE PREFERRED EMBODIMENT

The present invention is described in the context of a custom "music CD" ordering, assembly, manufacturing and distribution system or "service" wherein the particular content (i.e., the digital data embodied on the physical medium, namely a "CD-ROM") is a set of one or more sound recordings. Thus, for example, the "product" is a CD-ROM on which approximately fifteen (15) different sound recordings or "tracks" are supported. This number, of course, is merely illustrative and depends on the size of the particular component files and the capacity of the storage medium. Thus, for example, if the medium is a digital video disk (DVD), up to one hundred (100) tracks or more may be supported. The particular sound recordings and their sequence are customer-selectable. Thus, the product is said to be "customized" or is a "custom" CD. Although this particular instantiation of the invention is one preferred method, it is merely representative of the various methods, techniques and systems may be used for any type of digital data and not merely music. Moreover, although the preferred "product" created by the invention is a CD-ROM, this is not a limitation either as the "product" may be a CD (read/write), DVD, digital audio tape, or any other physical medium on which digital data may be stored (even if by conversion). This includes now known or hereinafter developed tangible media.

Figure 1:
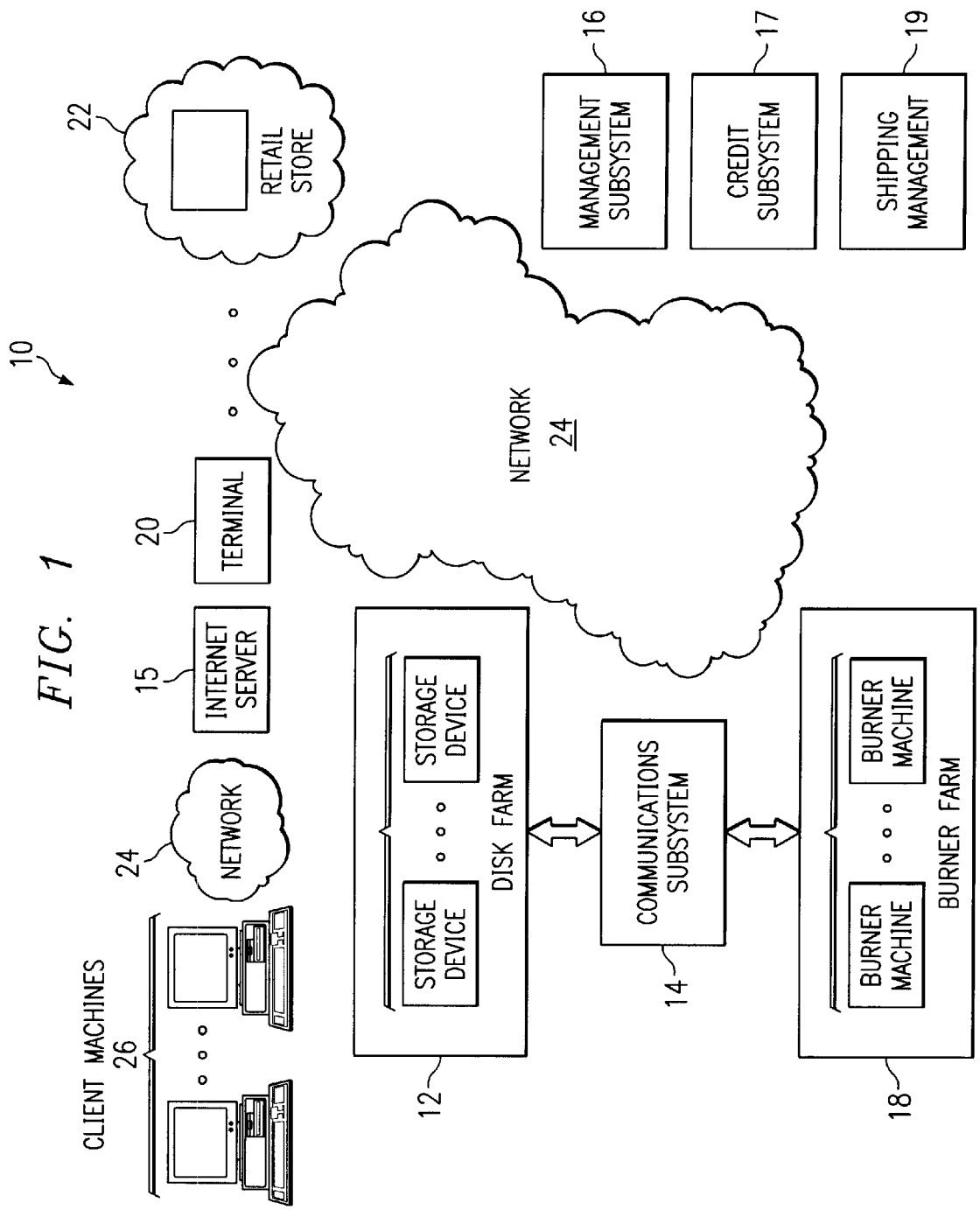
FIG. 1 is a representative computer-implemented custom product ordering, assembly, manufacturing and distribution system according to the present invention.

As seen in FIG. 1, the system 10 comprises a number of major components: a storage subsystem or "disk farm" 12, a communications subsystem 14, an Internet-type (e.g., a Web) server 15, a management subsystem 16, a credit subsystem 17 (which may be part of the system 10 or a separate third party-managed facility accessible via a known connection), a manufacturing subsystem or (in the case of a CD product) so-called "burner farm" 18, and a shipping management subsystem 19. As will be described below, the disk farm 12 generally includes a plurality of servers and a large number of networked or linked storage devices for supporting digital data comprising the library or "archive" of available sound recordings (or data). The burner farm generally includes a plurality of burner machines, each of which comprises a processor, a disk storage and one or more CD burner(s) Communications subsystem 14 generally includes a set of communication servers and, optionally, a directory server, which together facilitate very high speed transfer (e.g., on the order of 45 Megabytes/second or higher) of large amounts of digital data between the disk and burner farms, as will be described.

A set of retail machines 20, preferably located at retail establishments 22, interface to the system, preferably via the Internet 24, by a direct connection, or by some other computer network such as an intranet, an extranet or other known or hereinafter network connection. Each retail machine is preferably a "diskless" computer, sometimes referred to as a "network" computer. This is not a requirement of the invention, however. As is known in the art, a "network" computer includes a processor, random access or other "volatile" memory (RAM), a display interface, one or more input devices (such as a mouse, a keyboard, and the like), and appropriate communications hardware for interfacing the machine to a computer network. When the machine is turned on, operating system software and other application software is downloaded or loaded to the RAM for use during a particular network session, although such software does not normally remain resident on the machine. Preferably, the machine does not include a hard drive or other non-volatile memory system (but this is not a requirement). This is advantageous when the machine is implemented at a retail establishment, where many third parties come into contact with the machine and its operating components.

In a preferred embodiment, one or more of the product "ordering" features and functions of the present invention are provided at a given retail machine using a "Java"-type application. As is known in the art, Java is an object-oriented, multi-threaded, portable, platform-independent, secure programming environment used to develop, test and maintain software programs. Java programs include full-featured interactive, standalone applications, as well as smaller programs, known as applets, that run in a Java-enabled Web browser or in a Java-enabled virtual environment.

Preferably, a network computer located at a retail establishment includes a credit card reader or keypad for receiving a credit card or other billing information. Alternatively, the customer may simply pay for the product (at a register) and receive an access number (that.must be entered into the machine) or even a token. In a further alternative, a customer may purchase (at retail, electronically or otherwise) a "gift" certificate for a third party, who may then access the service by going to the retail establishment and supplying the gift number or token to the network machine (or an operator thereof). Of course, as used herein, "retail establishment" should be broadly construed to mean any publicly-accessible location (e.g., a kiosk or the like) and not merely a "for profit" retail store.

The assembly, manufacturing and distribution system 10 also preferably interfaces to a set of client machines 26, preferably via the Internet 24. A representative client machine 26 is a personal computer such as a desktop or notebook computer, e.g., an IBM® or IBM-compatible machine, running an Intel x86 or Pentium®-based computer processor with a Windows '95 operating system. Any suitable terminal with an Internet browsing capabilities, of course, may be used as a client machine. The client thus includes an appropriate graphical user interface (GUI). A typical client machine is located at customer's home or office and connects to the Internet via an Internet Service Provider (ISP) through a dialup network connection or through other direct connections that may be available. Alternatively, a client machine connects to the Internet through a so-called online service provider such as America Online® or the like. The particular method of connection, of course, is not pertinent to the present invention. Thus, for example, a "retail" machine need not be connected to the service via the Internet.

Each of the machines (possibly including the network computers located at the retail establishments) that interface to or form part of the system preferably include a "suite" or collection of known Internet tools to access other computers of the network and thus to obtain certain services. These services may include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP) or such other protocols hereinafter developed or adopted, which provides users access to multimedia files using Hypertext Markup Language (HTML) or any other hereinafter developed or adopted markup, scripting or alternative language or technique. The collection of servers that use HTTP comprise the World Wide Web, which is currently the Internet's multimedia information retrieval system. Digital files are normally transferred over the Internet using the File Transfer Protocol (FTP) in a known manner.

Referring back to FIG. 1, Internet server 15 supports a collection of related documents that together comprise a so-called "Web site" from which the custom CD-ROM manufacturing/distribution service of the present invention may be accessed. The Internet server 15 is shown as a single machine, but one of ordinary skill will appreciate that the site maybe "mirrored" or copied to comprise a plurality of similar server machines (scaled). The Web server 15 is accessible through the WWW or Internet-type network in a known manner. In the Internet paradigm, a network path to a server is identified by a so-called Uniform Resource Locator (URL) having a special syntax for defining a network connection. Use of an HTML-compatible browser (e.g., Netscape Navigator™ or Microsoft Internet Explorer™) at a client machine involves specification of a link via the URL. In response, the client makes a request to the server identified in the link and receives in return a document formatted according to HTML (or similar markup language, such as SGML or XML).

Management subsystem 16 includes a workstation or other similar computer or computers. Thus, for example, the management subsystem 16 comprises a computer, or a set of computers connectable via a local area network (LAN), wide area network (WAN) or other such connection. Management system 16 includes appropriate control routines for receiving and formulating information from the various order-entry terminals (and means) as described above, and, in response thereto, directing customer "orders" to the manufacturing facility. Management system also includes appropriate database or other storage facilities for maintaining transaction information including, without limitation, the identity of each customer accessing the service, the customer's identifying information (e.g., name, address, social security number, credit card information and validation information, personal identification number ("PIN") or other security information), historical information about past purchases or inquiries, playlists for CD-ROMs previously-purchased, "favorites" lists, and the like. The management system 16 also includes control routines for managing transactions.

Preferably, the management system operates in a secure manner (e.g., using SSL) such that only the customer and third parties authorized by the customer may access the stored user and preferences information. Using information in the management system, the service provider may determine the particular sound recordings or data previously "purchased" by the customer. Although not required, the management server may also implement an advertising or other content server that formats and displays specialized ads or other content (such as announcements of new recordings, artist concerts, and the like) that may be of interest to a particular customer based on the customer's past preferences. Such display may be in the form of "banner" ads as part of a Web page when the user contacts the Internet server 15, or the information may be provided via e-mail, or even via direct mail or the like.

Management subsystem 16 preferably also includes an accounting system for administration and management of all customer transactions. Functions typically provided by the accounting system include transaction handling, billing, account management and the like. The accounting routine interfaces with the credit subsystem 17 in a known manner to "validate" a particular credit card information.

Although not meant to be limiting, a representative server platform for use as the Web server 15 and in the management subsystem 16 is an IBM RISC System/6000 computer (a reduced instruction set of so-called RISC-based workstation) running the AIX (Advanced Interactive Executive Version 4.1 and above) operating system and server program(s). The platform also includes a graphical user interface (GUI) for management and administration. It may also include an application programming interface (API). Although the above platform is useful, any other suitable hardware/operating system/server combinations may be used.

Communications interface 14 also includes all the necessary hardware, software and communications devices to facilitate high speed, secure communications to and from the management subsystem to the other components of the service. Thus, in the preferred embodiment, the communications interface implements a firewall or other convenient security mechanism.

A user accessing the system selects a "set" of recordings (e.g., (song/artist) 1; (song/artist) 2, and so forth). Preferably, in the case of a music CD-ROM, approximately fifteen (15) titles are selected for a particular product. The particular technique for selecting the titles will depend on the interface and thus the method of accessing the service. In a typical case, a user of a client machine accesses the Internet server 15 through a Web browser and is presented with an option to purchase a custom CD. Using a convenient user interface (e.g., preferably implemented in a Java-type applet running in the browser), the customer selects a given artist and/or given sound recordings. A convenient technique (if feasible, given the particular terminal) for this purpose is a "drag-and-drop" interface wherein the customer selects a given title from one portion of the interface and "drags" the title to a playlist located on another portion of the interface. The customer may then re-order the selected titles, delete a particular title, add another title, save the playlist, and so forth. After the set of sound recordings (i.e., the playlist) for a particular custom CD is finalized, the customer's payment method is validated (e.g., using a call to the credit subsystem) and the "order" is accepted. The order is then assigned an order confirmation or "job" number by the management system. This order confirmation number is one preferred means by which the job is managed by the system (and tracked by the customer, as will be seen).

Figure 2:
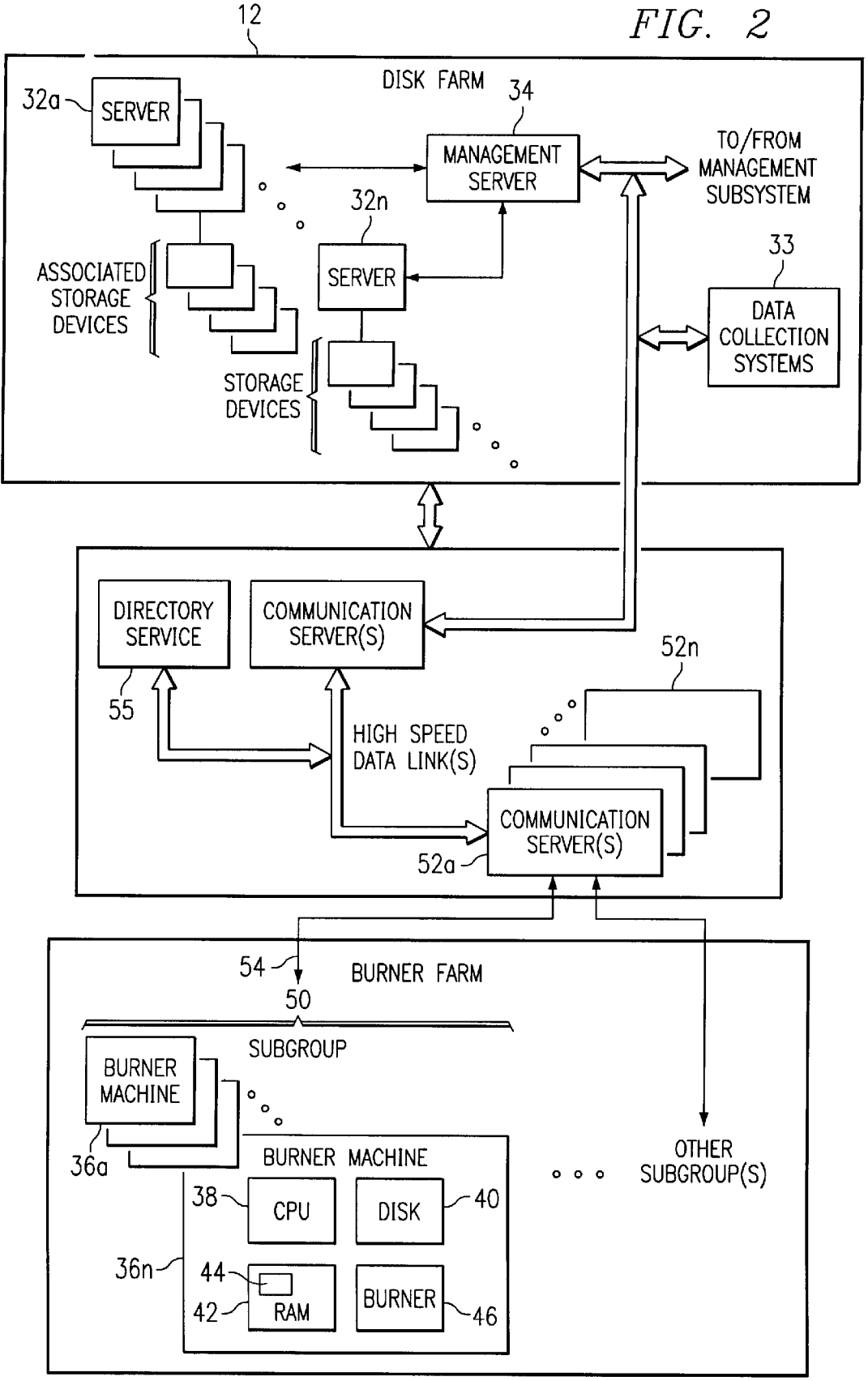
FIG. 2 is a block diagram of a preferred manufacturing facility that is connected to a large "disk farm" via a communications subsystem according to the teachings of the present invention.

Referring now to FIG. 2, the disk farm 12 preferably comprises a large number of servers 32a–32n and possibly 1000's of networked or linked storage devices for supporting the digital data. A representative storage device is a disk, optical disk storage or the like. Appropriate data collection systems 33 may be used to collect sound recordings or data and, if necessary, to convert such information into a suitable format for storage in the storage devices of the disk farm. If necessary, one or more "management" servers 34 may be used to control individual machines in the farm. By way of example only, a typical "popular" musical sound recording may comprise 40–50 Megabytes of data, and therefore twenty (20) of such recordings comprise about one (1) Gigabyte. Assuming a relatively large inventory of recordings (e.g., 200,000–3,000,000 song tracks), a massive storage (e.g., 10–150 Terabytes) is required. Such storage is provided by the servers 32 and their associated storage systems. Of course, the particular number and type of recordings is not a limitation of the invention, although it is expected that the disk farm supports a very large number of song tracks to enhance the overall service. The disk farm 12 is shown as a collection of servers 32a–32n (and their associated storage systems located at a particular location, although one of ordinary skill will appreciate that the disk farm may be mirrored, or that individual servers and/or storage systems, may be geographically-dispersed. As particular song tracks are added to the disk farm, information about the new tracks (and their availability) is dispersed throughout the network (e.g., to the management subsystem and the Internet server or other communication interfaces).

The burner farm likewise comprises a large number (e.g., 1000's) of individual burner machines 36a–36n. Each burner machine is a known or hereinafter-developed machine is basically a computer-controlled burner device comprising a processor (CPU) 38, disk storage 40, RAM 42, control software 44, and the burner(s) 46. The burner 46 transfers assembled digital data to the static storage medium 48 to generate the CD product.

A plurality of burner machines is typically supported in a subgroup 50. Each subgroup 50 is preferably associated with a particular one of the communications servers 52a–52n (that comprise the communications subsystem) via a local area network (LAN) or other network connection 54. A typical connection 54 is a 100–1200 Megabit/second Ethernet connection, although this is not a limitation of the invention. As illustrated in FIG. 2, communications across the communications system (i.e., to and from the disk and burner farms via the communications servers 52) are effected at a very high speed (e.g., using asynchronous transfer mode (ATM) switching or fiber) over a very high speed backbone (e.g., 45 Megabytes/second or higher). Communications within a particular subgroup of burner machines is at a relatively slower rate (e.g., 100–1200 Megabit/second). A typical CD-ROM burner in a burner machine 36 operates at "4X" or higher X (or 600,000 bytes/second or higher), and thus between about 30–50 burner machines are typically associated with a given subgroup. This amount may vary, of course, depending on the network bandwidth, the bandwidth of the LAN or other network connection 54, and the capability of and/or loading or unloading the burner machines in the subgroup.

In accordance with an important advantage of the invention, the individual burner machines 36 preferably control their own operation or "destiny." Thus, for example, each burner machine may include control software that, upon initialization of the machine, repeatedly cycles through a given task list. Each task in the list has associated therewith a set of procedures that are then carried out. A representative task list for a given burner machine may include Task 1 (perform CD-ROM burn), Task 2 (perform self-diagnostic routines), etc. A representative task list for another burner machine may have a different set of tasks (e.g., a given burner machine may be dedicated to burning only DVDs), or a different ordering of the tasks, or some other variant. A given task list is preferably downloaded to each of the given burner machines in a subgroup upon initialization of the subgroup by the management subsystem (e.g., at the start of a day or given manufacturing cycle). The task list for each subgroup or burner machines within a subgroup may thus vary on a periodic basis.

When a burner machine is initialized or is otherwise idle, it polls (but may also be sent by) the management subsystem, in effect, requesting new work. If, at that time, the management subsystem has an order for a custom CD product that has not been assigned to a particular burner machine, the management subsystem 16 assigns the order to the burner machine. Thus, for example, the management subsystem provides an order/shipping number, the customer's name and address, the song tracks, their sequence, the identity of a shipper, and other necessary information. As the burner machine then cycles through its task list, the order is then processed by that burner machine.

Preferably, but not by way of limitation, the actual song track components are "retrieved" by the burner machine (or by some control device on its behalf). Thus, for example, and with reference to FIG. 2, the particular burner machine that is processing the order may poll the directory service 55 to obtain the particular location of the file comprising the component in question. The directory service 55 may return the actual location information (e.g., "track 1: located on server 7, disk bank 52 ") to enable the burner machine to then retrieve the file directly, or the directory service may provide appropriate control signals to that server/disk bank location so that the file can be downloaded directly. In either case, the component file is copied over the high speed datalink until it reaches the subgroup with which the particular burner machine is associated. The song track component (typically in the form of a .wav file) is then transferred (via the possibly lower speed connection 54) to the buffer/cache storage of the burner machine (or server). At this time, hidden "codes" may be implanted within (or otherwise associated with) the sound recording (or data) to later facilitate the tracking (by order number) the origin of a particular copy of a sound recording (or data).

Once a particular burner machine receives all the data necessary to burn the product, the burning process preferably should not be interrupted to ensure a high quality, usable product. Thus, the particular management routines in each of the disk farm and burner farm machines preferably include appropriate control routines to ensure that once the set of component files have been received at the burner machine, the particular burner machine responsible for the burn will then be isolated from other network traffic (or other similar system interference) that might otherwise interrupt or disable the particular burn. In a possible embodiment, the burner machine is forced to log off or otherwise disconnect from the network (e.g., the communications subsystem) before the burn starts. In this manner, all bytes comprising a single product may be buffered (without network interruption) in the particular burner machine prior to initiation of the CD-ROM burn.

Thus, according to the present invention, the manufacturing facility operates in a "burner-centric" manner with each of the burner machines preferably controlling its own "destiny" (e.g., whether it is operating to burn a particular CD at a given period of its operation). Each burner machine is provided its own task list (which may vary periodically or across any given subgroup of such machines). The burner machine cycles through the various tasks on its list, and polls the management subsystem for new work whenever necessary. The distributed burner-centric architecture ensures that no particular machine or subgroup of machines can become a "bottleneck" to the overall operation of the service. Indeed, using the task list(s), the service operator or automated manager may take individual burner machines offline for repair and maintenance, or to otherwise address network or other service problems without materially impacting production quantity or the percentage of acceptable products.

During the manufacturing process, one or more "events" are tracked and recorded including, without limitation, the time at which the completed "image" is assembled from the disk farm, the time at which the data comprising individual components is sent over the communications subsystem, the particular identity of the burner in the manufacturing farm that is selected for servicing a given request, the time at which the burner "logs-off" from the network (or otherwise blocks receipt of new traffic or other interrupt activity), the "time" at which the particular burn is initiated, the "time" at which the particular burn is completed, the length of the burn, the "fact" that the burn was successful (or not), any errors or other occurrences of interest, and so forth. Such information (or any component thereof) is then made available to the management subsystem 16 of FIG. 1. In this manner, the customer may access the service to determine the particular state of his or her particular manufacturing request.

In particular, after credit or payment is verified, the management subsystem (or the Internet server) preferably notifies the customer of an order "confirmation" number. Although not required, this notification may be in the form of an e-mail message that includes a hyperlink (with the order number comprising part of the link). When the user selects the hyperlink, the user's Web browser is launched to a tracking page (which is usually a page at the Internet server 15) that provides order status updates to the customer. The user may alternatively navigate to the tracking page and enter a tracking number to obtain the given manufacturing status updates.

After a given CD-ROM has been created at a burner machine, the CD-ROM is removed from the burner and placed in a conventional "jewel" or other package along with various packaging materials or inserts (e.g. information about the various sound recordings or data on the CD). The particular type of package or packaging method is not limited to a jewel package, of course. The CD-ROM burner or some server associated therewith preferably includes a bar code or similar identifier generator that prints a "bar code" or other identifier uniquely identifying the particular product (e.g., by order number, shipping method, job number, batch number or the like). The bar code or other identifier is preferably printed at the burner machine (or at some server that is associated with the burner machines in the subgroup, for example) and placed on the packaging (either manually by a technician, or automatically). The bar code or other identifier is then read and the information provided to the shipping management subsystem 19, which is also preferably a computer or set of connected computers. Shipping management subsystem 19 may also include a quality control station associated therewith for running a set of quality checks on the products or their packaging, or both.

Shipping management subsystem 19 also preferably generates a second e-mail message or otherwise provides information to the customer that his or her custom CD-ROM has been shipped. Thus, for example, the second e-mail may include a hyperlink with an embedded shipping tracking number such that when the customer activates the link, he or she may access a tracking system (e.g., a third party site such as the UPS® or Federal Express® Web site) so that the particular movements of the product can be readily determined.

Although in the preferred embodiment of the invention the manufacturing facility is used to burn the CD product, this is not a requirement of the invention. Thus, for example, individual data components (such as song tracks) or whole assembled images (of such components) may be transmitted to a customer electronically so that the customer (if he or she has suitable equipment) may burn the physical medium directly or otherwise store the assembled data.

Many of the operations of the administrative and control functions of the management subsystem of the invention are provided in software. One of the preferred implementations of the invention is thus as a set of instructions (program code) in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

As used herein, "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof.

Having thus described my invention, what I claim as new and desire to secure by letters patent is set forth in the following claims.

What is claimed is:

1. A method of manufacturing a digital data product, the digital data product having digital information retrieved from across a network connection, the digital information stored in one or more information storage devices connected to the network, one or more burner machines connected to the network, the method comprising the steps of:
    selecting one or more digital data files from the one or more information storage devices;
    identifying one of the one or more burner machines to manufacture the digital data product;
    transferring each of the digital data files of the set to the identified burner machine;
    recording the digital data files of the set to a physical medium; and
    concurrently with the step of recording, reducing the number of network requests to the identified burner from any of the other devices communicatively coupled to the network.

2. The method as described in claim 1 wherein the one or more digital data files comprise sound recording tracks.

3. The method as described in claim 1 wherein one or more digital data files comprise a movie.

4. The method as described in claim 1 wherein the physical medium is selected from a group of physical media consisting of CD-ROM, DVD, digital audiotape, and other digital storage devices.

5. The method as described in claim 4 wherein the one or more digital data files in the disk farm are selected by a customer accessing the network from a terminal.

6. The method as described in claim 1 wherein the one or more digital data files in the disk farm are selected by a customer accessing the network through an electronic communication.

7. The method as described in claim 1 further including the step of verifying a customer payment method.

8. The method as described in claim 1 further including the step of providing a notification to the customer that an order has been accepted.

9. The method as described in claim 1, the step of reducing performed by another computing device communicatively coupled to the network.

10. The method as described in claim 1, the step of reducing performed by the identified burner machine.

11. The method as described in claim 1 further comprising:
    upon completion of the step of recording, allowing further network requests to the identified burner machine.

12. A method of manufacturing a digital data product on a data writer, the digital data product having digital information retrieved from one or more information storage devices connected to a network, one or more data writers connected to the network, the method comprising the steps of:
    selecting one or more digital data files from the one or more information storage devices;
    identifying one of the one or more data writers to manufacture the digital data product;
    transferring each of the digital data files of the set to the identified data writer;
    recording the digital data files of the set to a physical medium;
    minimizing the number of interruptions on the data writer; and
    the step of minimizing occurring immediately prior to or concurrently with the step of recording.

13. The method as described in claim 12 wherein the one or more digital data files comprise sound recording tracks.

14. The method as described in claim 12 wherein one or more digital data files comprise a movie in digital format.

15. The method as described in claim 12 wherein the physical medium is selected from a group of physical media consisting of CD-ROM, DVD, digital audiotape, and other digital storage devices.

16. The method as described in claim 12 wherein the one or more digital data files in the one or more information storage devices are selected by a customer accessing the network from a terminal.

17. The method as described in claim 12 wherein the one or more digital data files in the disk farm are selected by a customer accessing the network through an electronic communication.

18. The method as described in claim 12 further including the step of verifying a customer payment method.

19. The method as described in claim 18 further including the step of providing a notification to the customer that an order has been accepted.

20. The method as described in claim 12, the step of minimizing performed by another computing device communicatively coupled to the network.

21. The method as described in claim 12, the step of minimizing performed by the identified burner machine.

22. The method as described in claim 12 further comprising:
    upon completion of the step of recording, allowing further network requests to the identified data writer.

23. A method of manufacturing a digital data product on a digital recording device, the digital data product having digital information retrieved from one or more information storage devices connected to a network, one or more digital recording devices connected to the network, the method comprising the steps of:
    selecting one or more digital data files from the one or more information storage devices;
    identifying one of the one or more digital recording devices to manufacture the digital data product;
    transferring each of the digital data files of the set to the identified digital recording device;
    recording the digital data files of the set to a physical medium through the use of a first software operating on the digital recording device;

reducing a number of softwares operating on the digital recording device to a number that allows the successful completion of the step of recording.

24. The method as described in claim 23 wherein the one or more digital data files comprise sound recording tracks.

25. The method as described in claim 23 wherein one or more digital data files comprise a movie.

26. The method as described in claim 23 wherein the physical medium is selected from a group of physical media consisting of CD-ROM, DVD, digital audiotape, and other digital storage devices.

27. The method as described in claim 23 wherein the one or more digital data files in one or more information storage devices are selected by a customer accessing the network from a terminal.

28. The method as described in claim 23 wherein the one or more digital data files in one or more information storage devices are selected by a customer accessing the network through an electronic communication.

29. The method as described in claim 23 further including the step of verifying a customer payment method.

30. The method as described in claim 23 further including the step of providing a notification to the customer that an order has been accepted.

31. The method as described in claim 23, the step of reducing performed by the identified digital recording device.

32. The method as described in claim 23 further comprising:
upon completion of the step of recording, allowing the number of software on the identified digital recording device to increase.

* * * * *